(12) United States Patent
Hatazaki

(10) Patent No.: US 12,470,495 B2
(45) Date of Patent: Nov. 11, 2025

(54) DATA TRANSMITTING APPARATUS THAT TRANSMITS A DATA STREAM TO A RECEIVING APPARATUS VIA A NETWORK AND A CONTROL METHOD THEREOF

(71) Applicant: CANON KABUSHIKI KAISHA, Tokyo (JP)

(72) Inventor: Sho Hatazaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/524,032

(22) Filed: Nov. 30, 2023

(65) Prior Publication Data

US 2024/0214321 A1     Jun. 27, 2024

(30) Foreign Application Priority Data

Dec. 26, 2022 (JP) ................................ 2022-208802

(51) Int. Cl.
    *H04L 47/30*            (2022.01)
    *H04L 65/75*            (2022.01)

(52) U.S. Cl.
    CPC .............. *H04L 47/30* (2013.01); *H04L 65/75* (2022.05)

(58) Field of Classification Search
    CPC ................................ H04L 47/30; H04L 65/75
    See application file for complete search history.

(56) References Cited

U.S. PATENT DOCUMENTS

| | | | | |
|---|---|---|---|---|
| 6,081,843 A | * | 6/2000 | Kilkki | H04Q 11/0478 709/233 |
| 6,845,398 B1 | * | 1/2005 | Galensky | G06Q 20/32 709/219 |
| 7,345,996 B2 | * | 3/2008 | Imiya | H04L 43/00 370/232 |
| 9,185,045 B1 | * | 11/2015 | Yang | H04W 28/0289 |

(Continued)

FOREIGN PATENT DOCUMENTS

| | | |
|---|---|---|
| JP | H11308271 A | 11/1999 |
| JP | 2001016276 A | 1/2001 |
| JP | 2004297120 A | 10/2004 |

OTHER PUBLICATIONS

Office Action issued Aug. 23, 2024, in corresponding Japanese Patent Application No. 2022-208802, with English translation (10 pages).

*Primary Examiner* — Dhairya A Patel
(74) *Attorney, Agent, or Firm* — Venable LLP (57) ABSTRACT

A data transmitting apparatus having a transmitting unit transmitting, via a network, stream data to a receiving apparatus as a packet, includes memories storing instructions that, when executed, cause processors to obtain statistical information relating to the network while the transmitting unit transmits the stream data, to calculate, from the statistical information, a number of packets for which corresponding acknowledgment is not received, among transmitted packets, and determining, based on the number of packets, a first threshold value related to an amount of data buffered on the network, to halt the transmission of the data stream, if an amount of data of the stream data buffered on the network exceeds the first threshold value while the transmitting unit transmits the stream data at the first transfer rate, and to resume the data stream transmission at a second transfer rate that is lower than the first.

18 Claims, 5 Drawing Sheets

(56) References Cited

U.S. PATENT DOCUMENTS

| | | | |
|---|---|---|---|
| 9,374,406 B2* | 6/2016 | Gao | H04L 65/80 |
| 10,349,059 B1* | 7/2019 | Good | H04N 19/115 |
| 2003/0137948 A1* | 7/2003 | Komandur | H04L 1/187 |
| | | | 370/315 |
| 2013/0007206 A1* | 1/2013 | Sugimoto | G06F 9/505 |
| | | | 709/217 |
| 2015/0095509 A1* | 4/2015 | Huang | H04L 65/80 |
| | | | 709/231 |
| 2018/0033163 A1* | 2/2018 | Sugimoto | G06F 3/147 |
| 2018/0309652 A1* | 10/2018 | Lee | H04L 43/0894 |
| 2019/0200013 A1* | 6/2019 | Wu | H04N 19/164 |

\* cited by examiner

DATA TRANSMITTING APPARATUS THAT TRANSMITS A DATA STREAM TO A RECEIVING APPARATUS VIA A NETWORK AND A CONTROL METHOD THEREOF

CROSS-REFERENCE TO PRIORITY APPLICATION

This application claims the benefit of Japanese Patent Application No. 2022-208802, filed Dec. 26, 2022, which is hereby incorporated by reference herein in its entirety.

BACKGROUND OF THE INVENTION

Field of the Invention

The present invention relates to a technique for controlling the transfer rate in data transfer.

Description of the Related Art

When performing video streaming distribution in real time via a network, a disturbance or a halt of the video may happen due to a limitation of a bandwidth caused by congestion of the network. As a countermeasure, a technique called Adaptive Bit Rate (ABR) is used, which dynamically controls the transfer rate in accordance with the network condition (such as a bandwidth change). ABR is realized by utilizing statistical information of the network, for example. For example, Secure Reliable Transport (SRT), a video transmission protocol, realizes a high level of safety, reliability, and connectivity by obtaining statistical information of the network, and dynamically controlling the transfer rate based on the obtained statistical information. The statistical information of the network includes a number of transmitted and received packets, a number of retransmitted packets, a network bandwidth, Round Trip Time (RTT), or the like. Japanese Patent Laid-Open No. 11-308271 discloses a method of calculating an amount of data buffered on a network to control the transfer rate based on the difference between the calculated amount of data and a predetermined target value.

However, differences in the performance of ABR may arise, depending on how the obtained statistical information is used. For example, in Japanese Patent Laid-Open No. 11-308271, a good result is obtained for a moderate bandwidth limitation, but the change of the transfer rate cannot catch up with a rapid bandwidth limitation, which may lead to disturbance or a long-time halt of the video.

SUMMARY OF THE INVENTION

According to one aspect of the present invention, a data transmitting apparatus comprises a transmitting unit configured to transmit stream data to a receiving apparatus via a network, an obtaining unit configured to obtain statistical information relating to the network, a determination unit configured to determine a first threshold value that is related to an amount of data buffered on the network, and a transmission control unit configured to halt the transmission of the stream data by the transmitting unit, if an amount of data of the stream data buffered on the network exceeds the first threshold value while the transmitting unit is transmitting the stream data at a first transfer rate, and resume the transmission of the stream data by the transmitting unit at a second transfer rate that is lower than the first transfer rate, wherein the determination unit determines the first threshold value based on the statistical information obtained by the obtaining unit while the transmitting unit is transmitting the stream data.

The present invention allows for determining an appropriate transfer rate in data transmission.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereafter, embodiments will be described in detail with reference to the attached drawings. Note, the following embodiments are not intended to limit the scope of the claimed invention. Multiple features are described in the embodiments, but a limitation is not made to an invention that requires all such features, and multiple such features may be combined as appropriate. Furthermore, in the attached drawings, the same reference numerals are given to the same or similar configurations, and a redundant description thereof is omitted.

First Embodiment

A first embodiment of a data transmitting apparatus according to the present invention will be described below, taking a camera, as an example, that transmits video data to a client apparatus. Here, the data to be transmitted is not limited to video data, and any data generally transmitted in the form of stream transmission is applicable.

<Configuration of System and Each Apparatus>

Figure 1:
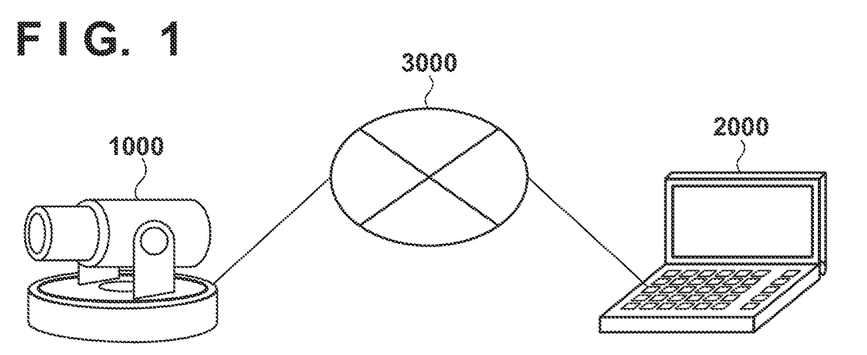
FIG. 1 is a diagram illustrating an overall configuration of a system.

FIG. 1 is a diagram illustrating an overall configuration of a system. The system includes a camera 1000, a client apparatus 2000, and a network 3000. The camera 1000 can transmit video data to the client apparatus 2000 via the network 3000.

Figure 2:
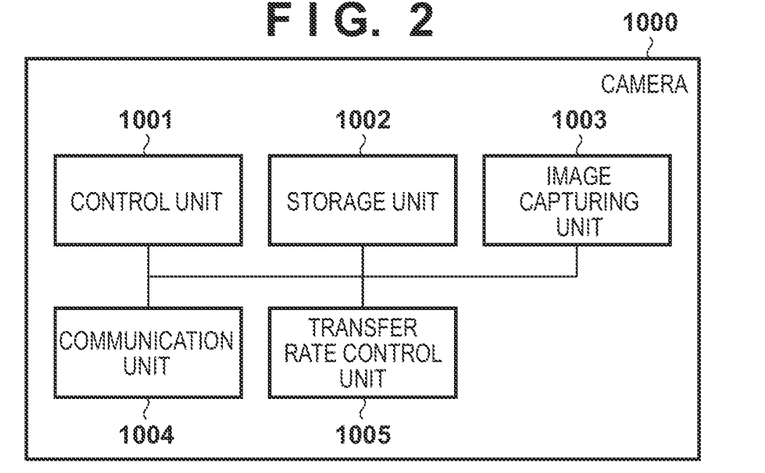
FIG. 2 is a block diagram illustrating an internal configuration of a camera.

FIG. 2 is a block diagram illustrating an internal configuration of the camera 1000. A control unit 1001 controls the entire information processing apparatus. The control unit 1001 includes, for example, a Central Processing Unit (CPU), an Application Specific Integrated Circuit (ASIC), or the like. A storage unit 1002 is used as a storage area of various data such as a storage area for programs executed by the control unit 1001, a work area during execution of a program, or the like. The storage unit 1002 includes, for example, a Random Access Memory (RAM), a Read Only Memory (ROM), various storages (HDD or SSD), or the like.

An image capturing unit 1003 converts an analog signal obtained by capturing an image of a subject into digital data, and outputs the digital data to the storage unit 1002 as a captured image. A communication unit 1004 is a transmitting unit that transmits video data and each setting value to the client apparatus 2000 using a predetermined video transmission protocol, and also is a reception unit that receives each setting value, acknowledgment, or the like. The communication unit 1004 sequentially transmits stream data such as video data as a packet. A transfer rate control unit 1005 performs transmission control, in which the transfer rate for transmitting the video data to the client apparatus 2000 is controlled in accordance with the network condition. The transfer rate control unit 1005 controls the transfer rate using various types of information obtained by the communication unit 1004, as will be described in detail below.

Figure 3:
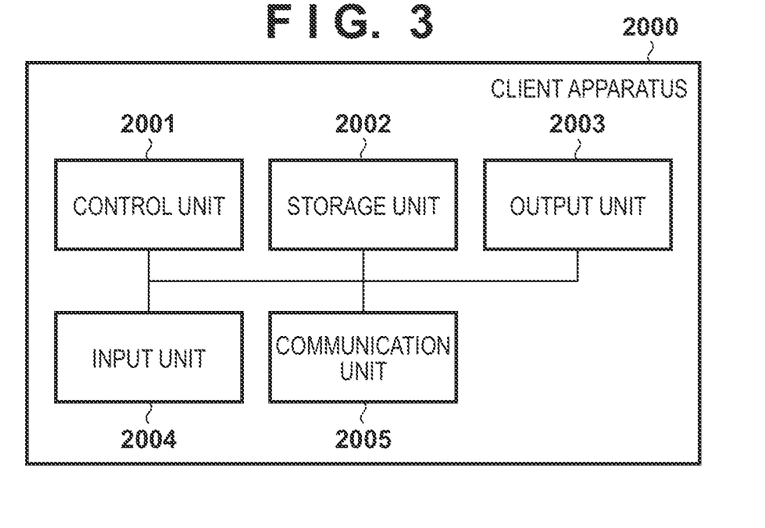
FIG. 3 is a block diagram illustrating an internal configuration of a client apparatus.

FIG. 3 is a block diagram illustrating an internal configuration of the client apparatus 2000. A control unit 2001 controls the entire client apparatus 2000. The control unit 2001 includes, for example, a CPU, an ASIC, or the like. A storage unit 2002 is used as a storage area of various data such as a storage area of programs executed by the control unit 2001, a work area during execution of a program, or the like. The storage unit 2002 includes, for example, a RAM, a ROM, an HDD, an SSD, or the like.

An output unit 2003 displays a screen for providing various pieces of information to a user of the client apparatus 2000. The output unit 2003 includes a Liquid Crystal Display (LCD), an Organic EL Display (OLED), or the like, for example, and displays, as information, a setting screen such as a Graphical User Interface (GUI), or video received from the camera 1000, for example.

An input unit 2004 accepts operations from the user and notifies the control unit 2001. The input unit 2004 includes, for example, a button, a cross key, a touch panel, a mouse, or the like, and accepts, for example, operations from the user via the aforementioned GUIs.

A communication unit 2005 receives video data and each setting value from the camera 1000, and transmits each setting value, acknowledgment, or the like, via the network 3000. Although it is assumed in the following description that SRT is used as the video transmission protocol, other protocols may be used.

Apparatus Operation

In the following, transfer rate control performed by the camera 1000 will be described, referring to FIG. 4 and FIG. 5. In the first embodiment, when the amount of data buffered on the network becomes great, after transmission of transmission frames of video data is started, transmission of the transmission frames is halted. Subsequently, transmission of transmission frames is resumed with a lowest transfer rate, and the transfer rate is increased thereafter.

Figure 4:
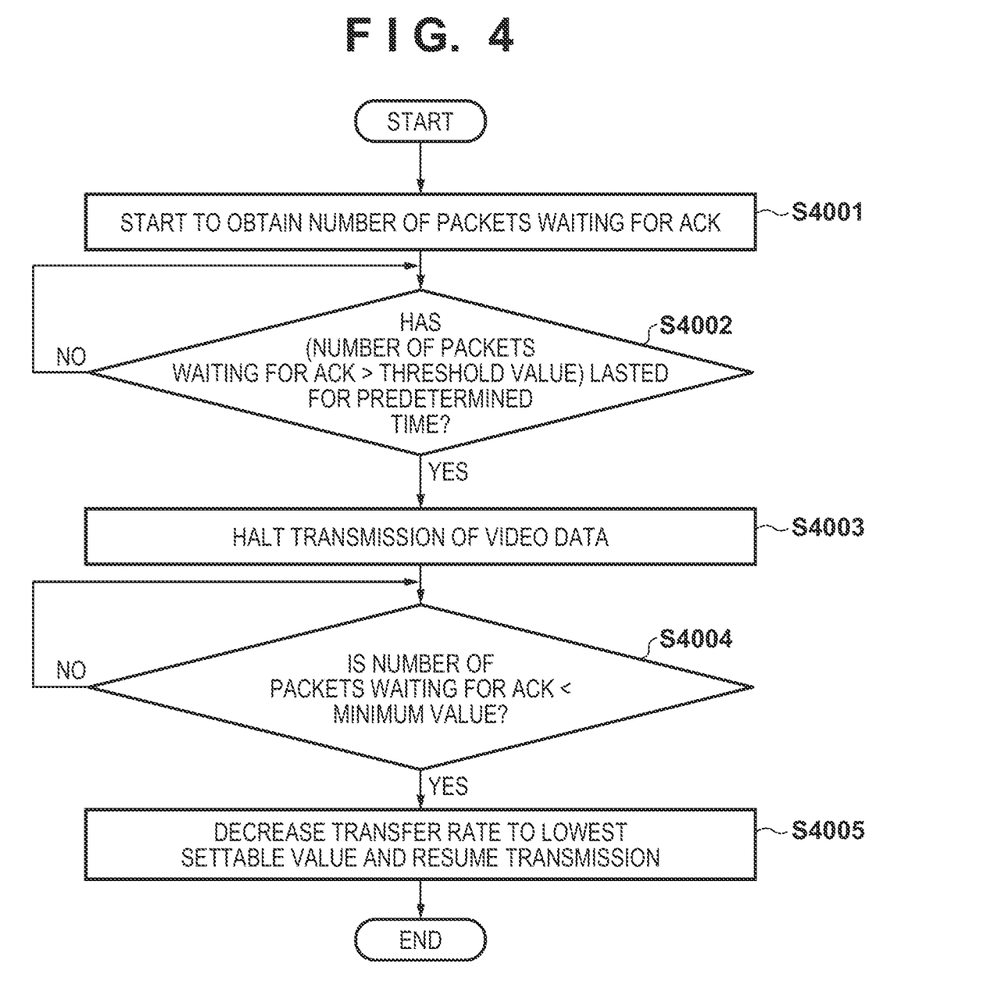
FIG. 4 is a flowchart illustrating decreasing control of the transfer rate.

FIG. 4 is a flowchart illustrating decreasing control of the transfer rate performed by the camera 1000. The decreasing control is executed after the camera 1000 started to distribute video to the client apparatus 2000 at an arbitrary target transfer rate.

At S4001, the transfer rate control unit 1005 starts obtaining the number of transmission frames (packets) for which corresponding acknowledgment (ACK) is not received, among the transmission frames (packets) transmitted by the communication unit 1004. In the following, the number of such packets is referred to as "number of packets waiting for ACK". For example, the number of packets waiting for ACK can be obtained from network statistical information obtained by the SRT function of the communication unit 1004. The amount of video data buffered on the network can be estimated from the information of the number of packets waiting for ACK. Subsequently, the transfer rate control unit 1005 periodically obtains the number of packets waiting for ACK.

At S4002, the transfer rate control unit 1005 determines whether or not a period, in which the number of packets waiting for ACK is equal to or greater than a first threshold value (or is exceeded the first threshold value), has lasted for a predetermined time or longer, while the communication unit 1004 is transmitting packets. For example, the determination is performed at a timing when a new number of packets waiting for ACK is obtained. When it is determined that the period, in which the number of packets waiting for ACK is equal to or greater than the first threshold value, has lasted for a predetermined time or longer, it is determined that a disturbance or a halt of the video being distributed may occur, and the processing proceeds to S4003. The first threshold value is a value that is updated at a constant interval, for example, and is a value that indicates a tolerable amount of data to be buffered on the network, as will be described in detail below.

At S4003, the transfer rate control unit 1005 halts the transmission of the video data by the communication unit 1004. This is because "Yes" in the determination at S4002 may occur in a case when the bandwidth of the network is limited, or the like.

At S4004, the transfer rate control unit 1005 determines whether or not the number of packets waiting for ACK has fallen below a second threshold value determined in advance. For example, the determination is performed at a timing when a new number of packets waiting for ACK is obtained. When the number of packets waiting for ACK falls below the second threshold value, the processing proceeds to S4005.

At S4005, the transfer rate control unit 1005 decreases the transfer rate to the lowest settable value and resumes the transmission of the video data by the communication unit 1004. Here, as the second threshold value is set to be a greater value, the time required until the transmission is resumed becomes shorter. However, if the second threshold value is overly great, the transmission may be resumed in a state of a great number of packets waiting for ACK, and, thus, a longer time may be required until the packets flow without delay. Therefore, the second threshold value may be determined based on a tolerable time required until the transmission is resumed. In addition, the lowest settable value refers to, for example, the lowest transfer rate included in a plurality of transfer rates that are preset at product shipment in accordance with the performance and specifications of the camera 1000.

Figure 5:
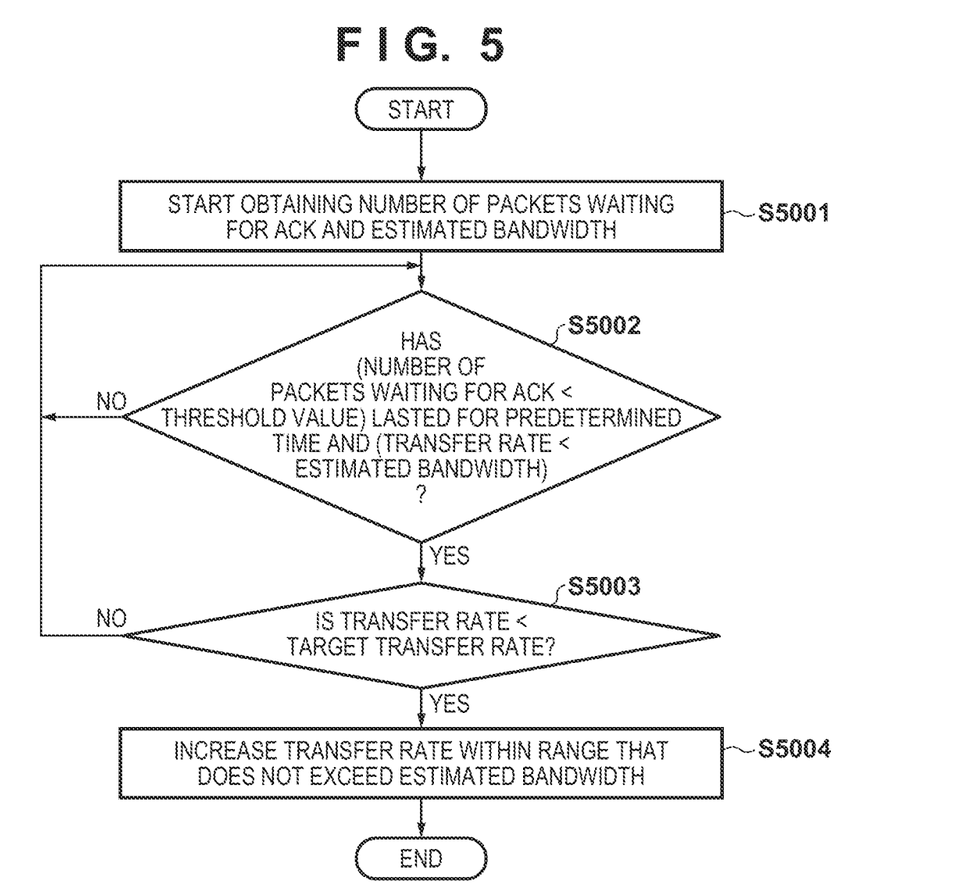
FIG. 5 is a flowchart illustrating increasing control of the transfer rate.

FIG. 5 is a flowchart illustrating increasing control of the transfer rate performed by the camera 1000.

At S5001, the transfer rate control unit 1005 starts obtaining the number of packets waiting for ACK and an estimated bandwidth. For example, the pieces of information can be obtained from network statistical information obtained by the SRT function of the communication unit 1004. Subsequently, the transfer rate control unit 1005 periodically obtains the number of packets waiting for ACK and the estimated bandwidth.

At S5002, the transfer rate control unit 1005 determines whether or not a condition one "the period, in which the number of packets waiting for ACK is below the first predetermined threshold value, lasts for a predetermined time or longer" and a condition two "the transfer rate is below an estimated bandwidth" are both satisfied. When both the condition one and the condition two are satisfied, it is determined that the bandwidth of the network has extra room in addition to the current transfer rate, and the processing proceeds to the S5003.

At S5003, the transfer rate control unit 1005 determines whether or not the current transfer rate is below the target transfer rate. When the current transfer rate is below the target transfer rate, the processing proceeds to S5003. Here, the target transfer rate refers to, for example, a transfer rate when the camera 1000 starts transmitting the current stream data. However, another transfer rate may be set as the target transfer rate.

At S5004, the transfer rate control unit 1005 determines a higher transfer rate (increased transfer rate) than the current transfer rate, within a range that does not exceed the estimated bandwidth. Determination of the transfer rate may be made by selecting available transfer rates one after another in ascending order to gradually increase the transfer rate, taking into account the possibility that the network bandwidth may be limited again after the transfer is resumed at the increased transfer rate. Note that, other methods may be used such as employing a predetermined transfer rate.

Figure 6:
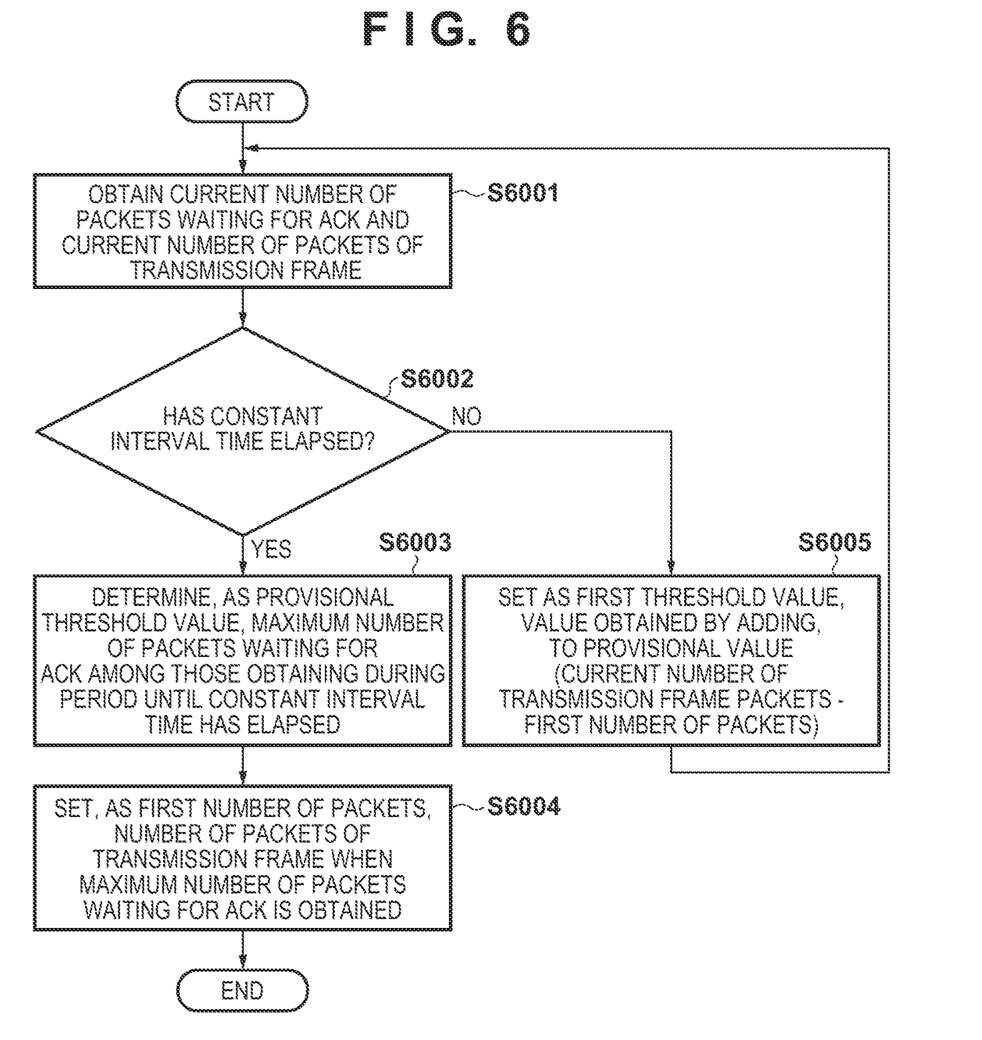
FIG. 6 is a flowchart illustrating determination of a first threshold value.

FIG. 6 is a flowchart illustrating a determination of the first threshold value performed in the camera 1000. The aforementioned processing is performed in parallel with the transmission of video data (including the operations in FIG. 4 and FIG. 5).

Specifically, a "provisional threshold value" is determined at a constant interval in accordance with the change in the network bandwidth. The "first threshold value" is then determined by adding a fixed value to the provisional threshold value in accordance with a variation in the number of packets buffered on the network. Here, a threshold value preset at product shipment, for example, is set at a timing such as immediately after the camera 1000 is powered on and activated.

At S6001, the transfer rate control unit 1005 obtains the current number of packets waiting for ACK and the current number of packets of the transmission frame. For example, the pieces of information can be obtained from network statistical information obtained by the SRT function of the communication unit 1004.

At S6002, the transfer rate control unit 1005 determines whether or not a constant interval time has elapsed. When the constant interval time has elapsed, the processing proceeds to S6003, otherwise proceeds to S6005. Here, although the value of the constant interval can be arbitrarily determined, it is preferred to be a value longer than the obtaining interval (e.g., one second) of the network statistical information and shorter than a typical time scale (e.g., ten minutes) of the bandwidth variation of the network.

At S6003, the transfer rate control unit 1005 determines, as a provisional threshold value, the maximum number of packets waiting for ACK among those obtained during a period until the constant interval time has elapsed. Subsequently, at S6004, the transfer rate control unit 1005 sets, as a "first number of packets", the number of packets of the transmission frame when the maximum number of packets waiting for ACK is obtained. In other words, the first number of packets is the number of transmission frame packets corresponding to the maximum number of packets waiting for ACK in the period in which the previous provisional threshold value was being used.

At S6005, the transfer rate control unit 1005 sets, as the first threshold value, a value obtained by adding, to the provisional value, a value obtained by subtracting the first number of packets from the current number of transmission frame packets, until the constant interval time elapses.

As such, by determining a provisional threshold value for each constant interval, the threshold value can be determined in accordance with the bandwidth of the network that is always changing. In addition, it is also possible to vary the threshold value by adding, to the provisional threshold, a value obtained by subtracting the first number of packets from the number of packets of the current transmission frame. In other words, even when the number of packets of the transmission frame varies due to a change in the amount of motion of the video or a variation in the transfer rate and the number of packets waiting for ACK varies, the threshold value can also be varied in accordance with those varies.

Although the first threshold value is determined based on the number of packets buffered on the network in the foregoing description, it may be determined based on other pieces of information. For example, the first threshold value may be determined based on a temporal change of the number of packets. For example, in the case of a compressed video using inter-frame prediction, the number of packets of the I-frame is relatively large in a period in which the change of video is small. Therefore, the first threshold value is determined based on the number of packets per unit time of the I-frame. Alternatively, the first threshold value may be determined based on the change of the transfer rate. For example, the first threshold value is increased by a constant value each time the transfer rate is increased by a constant value. Alternatively, a value obtained by adding an appropriate constant value to the maximum number of packets waiting for ACK may be used as the "provisional threshold value", instead of setting the maximum number of packets waiting for ACK as the "provisional threshold value".

As has been described above, the first embodiment controls the transfer rate of data transmission based on statistical information relating to the network used for data transmission. In particular, a provisional threshold value is determined at a constant interval and the first threshold value used for controlling the transfer rate is updated. The foregoing allows for determining an adaptive transfer rate for the bandwidth of the network. In particular, it allows for reducing the possibility of an occurrence of a disturbance or a halt of the video being distributed, even when a sudden bandwidth limitation (variation of the available bandwidth) happens.

Second Embodiment

In the second embodiment, transmission of video data is halted when the amount of video data buffered on the network becomes great, after transmission of video data has been started. A mode of decreasing the transfer rate step by step and subsequently resuming transmission will be described. Since the overall configuration of the system, and the internal configuration of the camera 1000 and the client apparatus 2000 are similar to those of the first embodiment (FIG. 1 to FIG. 3), the description thereof will be omitted. In addition, the setting processing of the first threshold value can also be performed similarly to that of the first embodiment (FIG. 6).

Apparatus Operation

Figure 7:
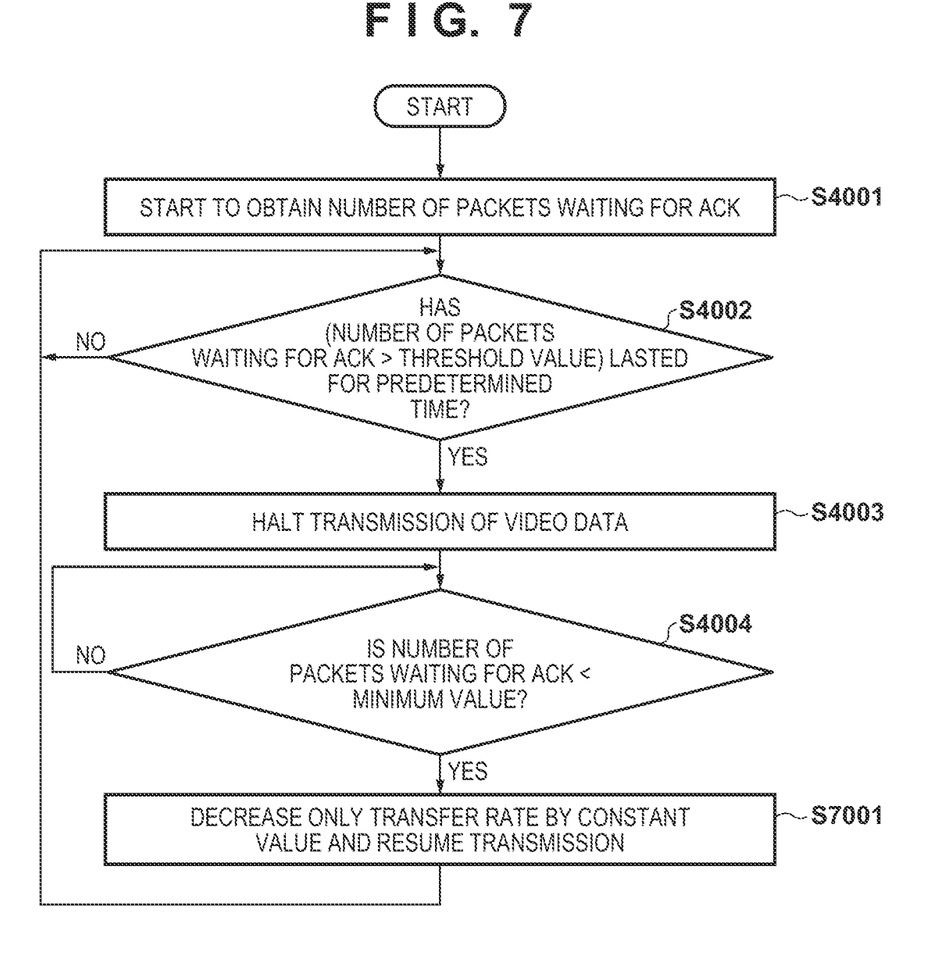
FIG. 7 is a flowchart illustrating decreasing control of the transfer rate (second embodiment).

FIG. 7 is a flowchart illustrating the decreasing control of the transfer rate performed by the camera 1000 according to the second embodiment. The decreasing control is executed after the camera 1000 has started distributing video, to the client apparatus 2000, at an arbitrary target transfer rate. The processing from S4001 to S4004 is similar to those of the first embodiment (S4001 to S4004 illustrated in FIG. 4), and thus the description thereof will be omitted.

When the number of packets waiting for ACK falls below the second threshold value at S4004, after the video data transmission has been halted at S4003, the processing proceeds to S7001.

At S7001, the transfer rate control unit 1005 decreases the transfer rate by a constant value and resumes the video data transmission by the communication unit 1004. Subsequently, the processing proceeds to S4002. Here, the constant value refers to, for example, a transfer rate that is lower by one step (or by a predetermined step) than the current transfer rate included in a plurality of transfer rates that are preset at product shipment in accordance with the performance and specifications of the camera 1000.

In other words, even when there is a possibility that a disturbance or a halt of the video being distributed may occur at the transfer rate that has been decreased by the constant value, the processing in FIG. 7 is repeatedly executed, and the transfer rate is decreased again at S7001 by a constant value. By repeatedly executing S7001, the transfer rate is decreased step by step and finally reaches a value that allows distribution without any disturbance or a halt.

Therefore, as the aforementioned constant value (decrease amount) is small, the eventual transfer rate is high, on the other hand when the constant value is overly small, a time required until the transfer rate is completely decreased may be long and, thus, a video halting time may likely to extend.

As has been described above, the second embodiment makes it possible to suppress a rapid change of the image quality in the client apparatus by decreasing the transfer rate step by step and thereafter resuming the transmission.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A data transmitting apparatus having a transmitting unit transmitting, via a network, stream data to a receiving apparatus as a plurality of packets, the data transmitting apparatus comprising:
   one or more processors; and
   one or more memories storing instructions that, when executed by the one or more processors, cause the one or more processors:
   to obtain statistical information relating to the network while the transmitting unit is transmitting the stream data;
   to calculate, from the statistical information, a number of packets for which a corresponding acknowledgment is not received, among packets transmitted by the transmitting unit;
   to determine, based on the number of packets, a first threshold value that is related to an amount of data buffered on the network; and
   to halt the transmission of the stream data by the transmitting unit, if an amount of data of the stream data buffered on the network exceeds the first threshold value while the transmitting unit is transmitting the stream data at the first transfer rate, and to resume the transmission of the stream data by the transmitting unit at a second transfer rate that is lower than the first transfer rate,
   wherein the obtaining of the statistical information, the calculating of the number of packets, and the determining of the first threshold value are performed repeatedly.

2. The data transmitting apparatus according to claim 1, wherein the transmission of the stream data by the transmitting unit is resumed, when an amount of data of the stream data buffered on the network falls below a second threshold value, after the transmission of the stream data by the transmitting unit is halted.

3. The data transmitting apparatus according to claim 2, wherein the second threshold value is determined based on a tolerable time from the halting to the resuming of the transmission of the stream data by the transmitting unit.

4. The data transmitting apparatus according to claim 1, wherein the second transfer rate is a lowest transfer rate available for transmission of the stream data by the transmitting unit, and the transfer rate of the stream data by the transmitting unit is gradually increased after the transmission of the stream data by the transmitting unit is resumed at the second transfer rate.

5. The data transmitting apparatus according to claim 4, wherein the statistical information includes an estimated bandwidth of the network, and the transfer rate is increased within a range that does not exceed the estimated bandwidth.

6. The data transmitting apparatus according to claim 1, wherein the second transfer rate is a transfer rate that is lower than the first transfer rate, among a plurality of rates available for transmission of the stream data by the transmitting unit, and the transfer rate of the stream data by the transmitting unit is gradually decreased after the transmission of the stream data by the transmitting unit is resumed at the second transfer rate.

7. A method of controlling a data transmitting apparatus including a transmitting unit configured to transmit, via a network, stream data to a receiving apparatus as a plurality of packets, the method comprising:
    obtaining statistical information relating to the network while the transmitting unit is transmitting the stream data;
    calculating, from the statistical information, a number of packets for which a corresponding acknowledgment is not received, among packets transmitted by the transmitting unit;
    determining, based on the number of packets, a first threshold value that is related to an amount of data buffered on the network; and
    performing transmission controlling that halts the transmission of the stream data by the transmitting unit, if an amount of data of the stream data buffered on the network exceeds the first threshold value, while the transmitting unit is transmitting the stream data at the first transfer rate, and resumes the transmission of the stream data by the transmitting unit at a second transfer rate that is lower than the first transfer rate,
    wherein the obtaining of the statistical information, the calculating of the number of packets, and the determining of the first threshold value are performed repeatedly.

8. The method of controlling a data transmitting apparatus to claim 7, wherein the transmission of the stream data by the transmitting unit is resumed, when an amount of data of the stream data buffered on the network falls below a second threshold value, after the transmission of the stream data by the transmitting unit is halted.

9. The method of controlling a data transmitting apparatus according to claim 8, wherein the second threshold value is determined based on a tolerable time from the halting to the resuming of the transmission of the stream data by the transmitting unit.

10. The method of controlling a data transmitting apparatus according to claim 7, wherein the second transfer rate is a lowest transfer rate available for transmission of the stream data by the transmitting unit, and the transfer rate of the stream data by the transmitting unit is gradually increased after the transmission of the stream data by the transmitting unit is resumed at the second transfer rate.

11. The method of controlling a data transmitting apparatus according to claim 10, wherein the statistical information includes an estimated bandwidth of the network, and the transfer rate is increased within a range that does not exceed the estimated bandwidth.

12. The method of controlling a data transmitting apparatus according to claim 7, wherein the second transfer rate is a transfer rate that is lower than the first transfer rate, among a plurality of rates available for transmission of the stream data by the transmitting unit, and the transfer rate of the stream data by the transmitting unit is gradually decreased after the transmission of the stream data by the transmitting unit is resumed at the second transfer rate.

13. A non-transitory computer-readable recording medium storing a program that, when executed by a computer, causes the computer to perform a method of controlling a data transmitting apparatus including a transmitting unit configured to transmit, via a network, stream data to a receiving apparatus as plurality of packets, the method comprising:
    obtaining statistical information relating to the network while the transmitting unit is transmitting the stream data;
    calculating, from the statistical information, a number of packets for which corresponding acknowledgment is not received, among packets transmitted by the transmitting unit;
    determining, based on the number of packets, a first threshold value that is related to an amount of data buffered on the network; and
    performing transmission controlling that halts the transmission of the stream data by the transmitting unit, if an amount of data of the stream data buffered on the network exceeds the first threshold value, while the transmitting unit is transmitting the stream data at the first transfer rate, and resumes the transmission of the stream data by the transmitting unit at a second transfer rate that is lower than the first transfer rate,
    wherein the obtaining of the statistical information, the calculating of the number of packets, and the determining of the first threshold value are performed repeatedly.

14. The method according to claim 13, wherein the transmission of the stream data by the transmitting unit is resumed, when an amount of data of the stream data buffered on the network falls below a second threshold value, after the transmission of the stream data by the transmitting unit is halted.

15. The method according to claim 14, wherein the second threshold value is determined based on a tolerable time from the halting to the resuming of the transmission of the stream data by the transmitting unit.

16. The method according to claim 13, wherein the second transfer rate is a lowest transfer rate available for transmission of the stream data by the transmitting unit, and the transfer rate of the stream data by the transmitting unit is gradually increased after the transmission of the stream data by the transmitting unit is resumed at the second transfer rate.

17. The method according to claim 16, wherein the statistical information includes an estimated bandwidth of the network, and the transfer rate is increased within a range that does not exceed the estimated bandwidth.

18. The method according to claim 13, wherein the second transfer rate is a transfer rate that is lower than the first transfer rate, among a plurality of rates available for transmission of the stream data by the transmitting unit, and the transfer rate of the stream data by the transmitting unit is gradually decreased after the transmission of the stream data by the transmitting unit is resumed at the second transfer rate.

* * * * *